US007020682B2

(12) United States Patent
Homma et al.

(10) Patent No.: US 7,020,682 B2
(45) Date of Patent: Mar. 28, 2006

(54) ARTICLE INFORMATION PROVIDING SYSTEM AND MEDIATE APPARATUS

(75) Inventors: Itomi Homma, Chiba (JP); Hiroshi Ikeda, Tochigi (JP); Takeshi Ito, Tokyo (JP)

(73) Assignee: Kao Corporation, Tokyo (JP)

( * ) Notice: Subject to any disclaimer, the term of this patent is extended or adjusted under 35 U.S.C. 154(b) by 671 days.

(21) Appl. No.: 09/874,982

(22) Filed: Jun. 7, 2001

(65) Prior Publication Data

US 2001/0051945 A1 Dec. 13, 2001

(30) Foreign Application Priority Data

Jun. 7, 2000 (JP) ............................ 2000-170658

(51) Int. Cl.
*G06F 15/13* (2006.01)

(52) U.S. Cl. ..................... 709/203; 709/202; 709/246; 707/3

(58) Field of Classification Search ................ 709/202, 709/203, 246; 707/3
See application file for complete search history.

(56) References Cited

U.S. PATENT DOCUMENTS 6,009,459 A * 12/1999 Belfiore et al. ............. 709/203
6,049,821 A * 4/2000 Theriault et al. ........... 709/203
6,338,082 B1 * 1/2002 Schneider .................... 709/203
6,374,305 B1 * 4/2002 Gupta et al. ................ 709/246
6,629,092 B1 * 9/2003 Berke ............................ 707/3
6,697,836 B1 * 2/2004 Kawano et al. ............. 709/202

FOREIGN PATENT DOCUMENTS

JP 11-53379 2/1999
WO WO 98/18093 4/1998

* cited by examiner

*Primary Examiner*—Zarni Maung
*Assistant Examiner*—Jinsong Hu
(74) *Attorney, Agent, or Firm*—Oblon, Spivak, McClelland, Maier & Neustadt, P.C.

(57) ABSTRACT

Disclosed is an article information providing system that includes a portable terminal to which an information demander inputs a desire for an article as demand information and that receives information corresponding to the demand information from an information provider. The article information providing system also includes a mediate apparatus provided with: registration means for registering each information provider and a keyword previously so as to allow the information and the keyword to correspond to each other; retrieval means for retrieving the keyword from the demand information; delivery destination determination means for determining the information provider as a delivery destination of the demand information, the information provider being registered in said registration means while corresponding to the keyword when the keyword is retrieved from the demand information; and transmission means for transmitting information to the information demander, the information being provided from the information provider determined by the delivery destination determination means and corresponding to the demand information.

21 Claims, 3 Drawing Sheets

ARTICLE INFORMATION PROVIDING SYSTEM AND MEDIATE APPARATUS

BACKGROUND OF THE INVENTION

The present invention relates to a system for providing article information and an apparatus for mediating the article information.

When a consumer buys an article at a store, the consumer can immediately buy an article concerned if he/she knows the name of the article that he/she wants to buy in advance. However, there are cases where the consumer has an indefinite desire regarding the characteristic of an article or an article such as "I want to buy a thing like this." or "I want to make myself look like this. Is there an article to help me look like this?", but does not know the name of the article.

In such a case, the consumer collects advertisements, catalogs and the like in advance to evaluate articles, or asks questions to a salesclerk at a store and compares the articles provided by the salesclerk, thereby selects the article.

To buy the article that fits the consumer's desire, he/she had to collect a lot of advertisement, catalog and the like to evaluate the articles before buying the article at the store. Alternatively, there has been the case where the consumer could not select the desired article without fail, because the salesclerk at the store did not have sufficient knowledge about the article desired by the consumer.

SUMMARY OF THE INVENTION

An object of the present invention is to provide an article information providing system for selecting an article desired by a consumer accurately and a mediate apparatus.

In order to solve the problems, the article information providing so system of the present invention includes a portable terminal 1 to which an information demander inputs a desire for an article as demand information and that receives information corresponding to the demand information from an information provider. The article information providing system also includes a mediate apparatus 2 provided with: registration means for registering each information provider and a keyword so as to allow the information and the keyword to correspond to each other; retrieval means for retrieving the keyword from the demand information; delivery destination determination means for determining the information provider as a delivery destination of the demand information, the information provider being registered in the registration means while corresponding to the keyword when the keyword is retrieved from the demand information; and transmission means for transmitting information to the information demander, the information being provided from the information provider determined by the delivery destination determination means and corresponding to the demand information.

Herein, the demand information is generally the information that the information demander (for example, the consumer) desires for the article, and means the data potentially including the keywords registered in the mediate apparatus in advance.

DETAILED DESCRIPTION OF THE PREFERRED EMBODIMENTS

Figure 1:
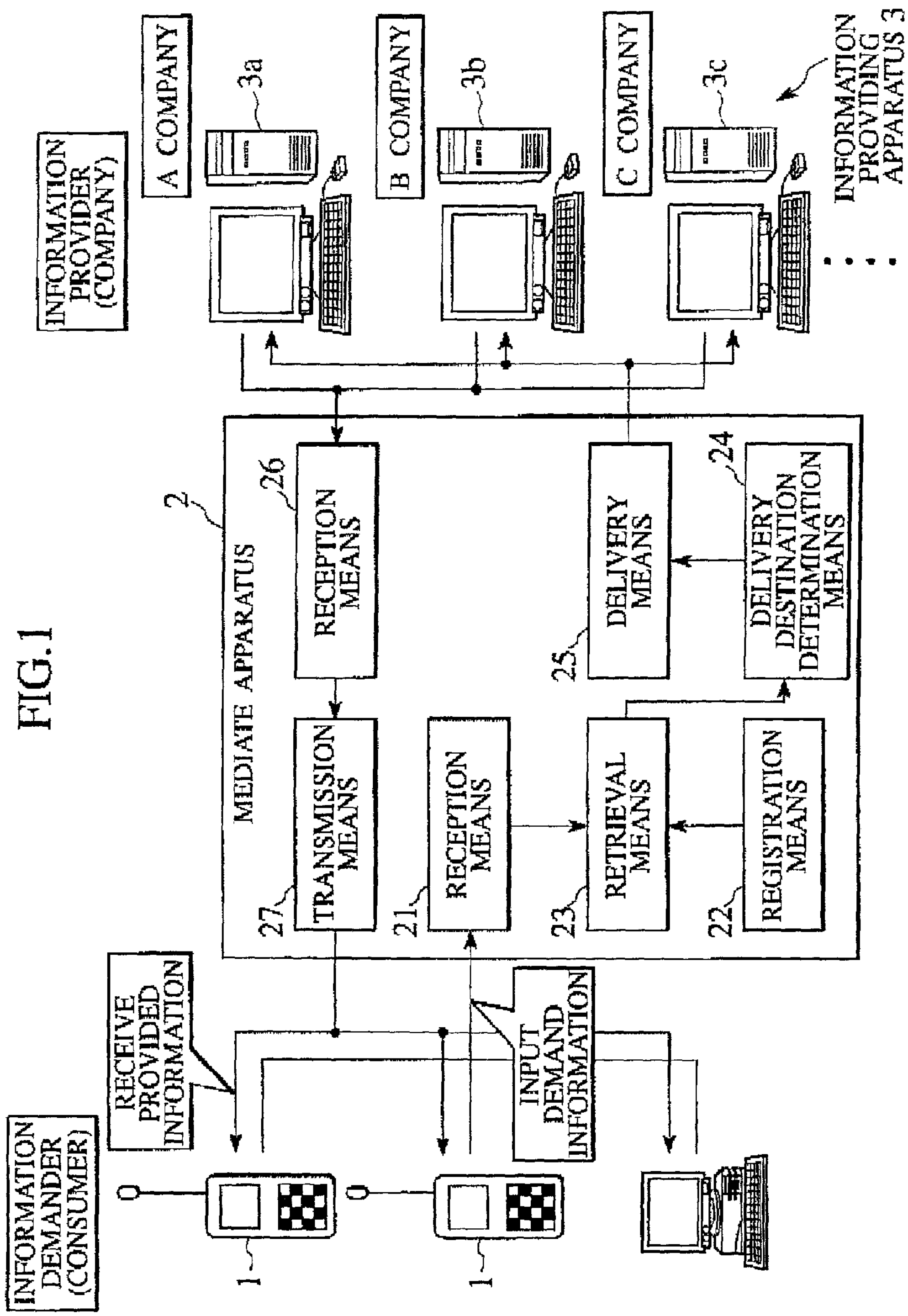
FIG. 1 is a constitutional block diagram showing an article information providing system of an embodiment.

The first embodiment of an article information providing system of the present invention shown in FIG. 1 is constituted by including: a portable terminal 1 (or a personal computer) owned by an information demander (for example, a consumer) who desires providing of information; a mediate apparatus 2 owned by a mediate company and that performs transmission/reception of information with the portable terminal 1 and the like; a plurality of information providing apparatuses 3 (3*a*, 3*b*, 3*c*, and so on) owned by a plurality of information providers (for example, a plurality of companies) and that performs transmission/reception of information with the mediate apparatus 2.

The portable terminal 1 is a cellular phone and the like owned by the consumer. The information demander (the consumer) who desires providing of information inputs a desire for an article to the portable terminal 1 as demand information, and receives information that fits the demand information from the information provider. The demand information consists of a combination of a plurality of words regarding the article desired by the consumer. The information (that fits the desire of the consumer) provided by the information provider includes added information such as article information showing an article name, a catalog explaining the article, and the like.

The mediate apparatus 2 is included in a computer system that operates as a mail server. The mediate apparatus 2 transmits the demand information received from the portable terminal 1 via a communication line to the information provider such as a manufacturer and a trading company, and transmits the information corresponding to the demand information provided by the information provider to the information demander.

The mediate apparatus 2, as shown in FIG. 1, is constituted by including: reception means 21; registration means 22; retrieval means 23; delivery destination determination means 24; delivery means 25; reception means 26; and transmission means 27.

The reception means 21 receives, for example, the demand information transmitted from the portable terminal 1 by the information demander as an electronic mail (hereinafter, referred to as a mail). Other than the demand information, a telephone number, a mail address of a transmitter or the like, which is information for identifying the transmitter and for determining a return destination, is added to the mail transmitted by the information demander, and such information is recorded. Specifically, the following methods are selectively performed, i.e., a method in which the reception means 21 receives notification of the transmitter number via a public telephone line system, a method in which the reception means urges the information demander to input an identification code for a desired shipping destination or for identifying the information demander previously registered, when transmitting the demand information, and the information provider replies the input, or the like. In the case where the telephone number and the identification code are sent, the transmission means selects a transfer destination by the information independently registered in advance when the article information and the like from the information provider is transferred to the information demander.

The registration means 22 is constituted of memory, with which keywords corresponding to the information providers are severally registered. As a registration method, registration previously made by the information provider via the communication line is preferable in the point that such method can be adapted to changes of a market and new products.

The retrieval means 23 executes retrieval processing that retrieves the keywords registered in the registration means 22 among the demand information received by the reception means 21.

The delivery destination determination means 24 performs delivery destination determination processing that determined only information provider who corresponds to the keywords retrieved from the demand information, as a delivery destination of the demand information. Specifically, the extracted keywords determine the information provider corresponding thereto. The information provider to whom the demand information is transferred is extracted by calculating logical sum of sets of the information providers extracted for every keyword. When the keywords and the information providers are registered while corresponding to each other in a database for keyword registration, the retrieval processing and the delivery destination determination processing are executed at once only by retrieving the keywords, which enables high-speed processing as a result.

The delivery means 25 includes a mail server that delivers the demand information to only information provider determined by the delivery destination determination means 24.

The reception means 26 receives response information that the information provider who received the demand information provides as a response to the demand information. The transmission means 27 transmits the response information received by the reception means 26 to the portable terminal 1 of the information demander.

Each of information providing apparatuses 3 is constituted of a computer that stores the article information including the name of each article for every article group in a database. The information providing apparatuses 3 read out the article information that fits the demand information sent from the mediate apparatus 2, and transmit the article information read out to the mediate apparatus 2. As the article group, for example, cosmetics, hairdressings, detergents and the like are cited.

Figure 2:
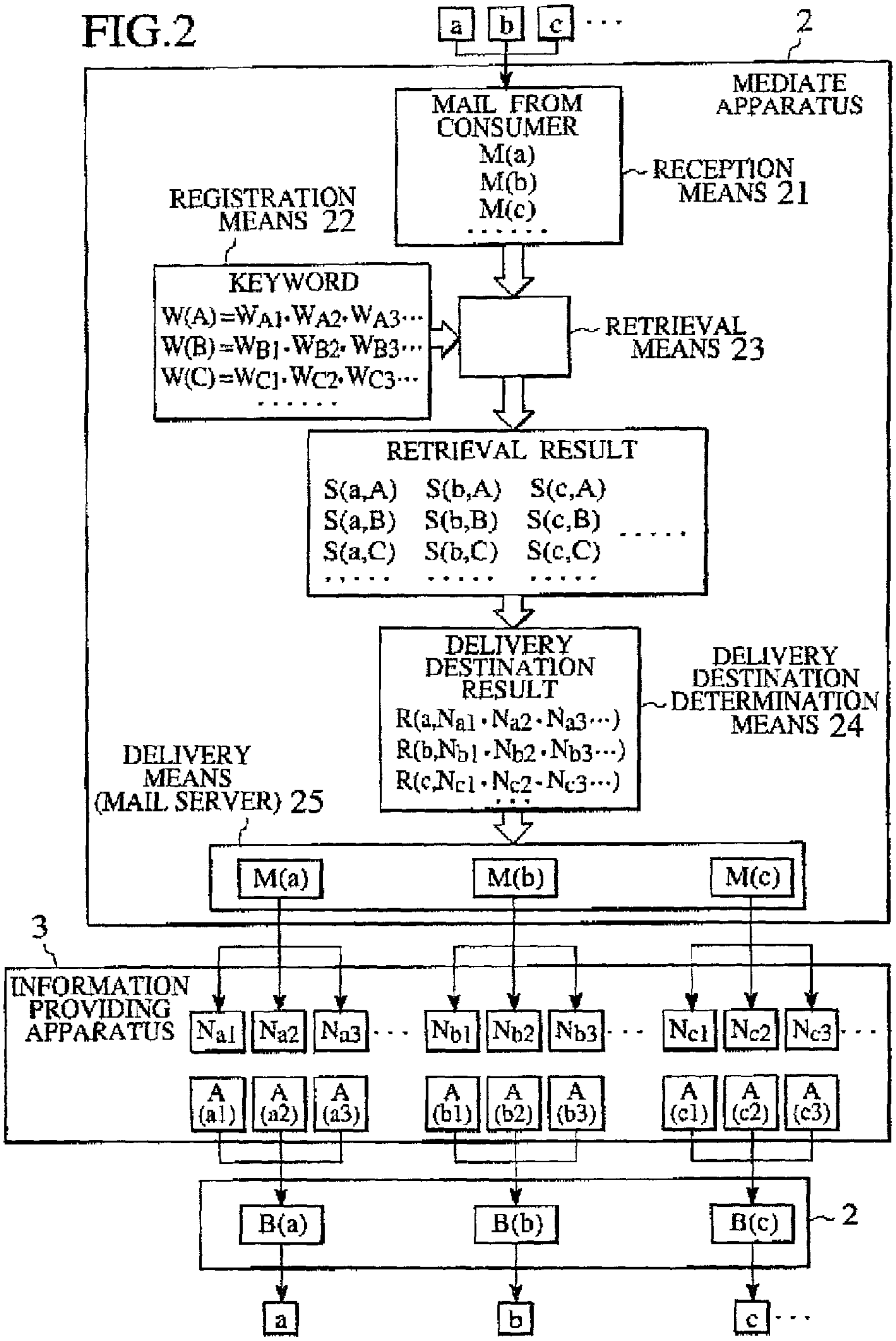
FIG. 2 is a diagram showing a basic operation of a first embodiment of the article information providing system.

Next, operation of the article information providing system will be described with reference to FIG. 2.

Firstly, each information provider and the keyword are registered in the registration means 22 while corresponding to each other. Specifically, a keyword W (N) (N=A, B, C . . . ) is registered for every information provider, The A, B, C . . . represent each information provider. For example, in the case of the information provider A, the keyword W (A)=$W_{A1}$, $W_{A2}$, $W_{A3}$ . . . are registered. The $W_{A1}$, $W_{A2}$, $W_{A3}$ . . . are each keyword.

Next, when the information demander transmits the demand information from the portable terminal 1 to the mediate apparatus 2 by a mail, the reception means 21 receives a mail M (n) (n=a, b, c . . . ) from the information demander n. The a, b, c . . . represent each information demander.

The retrieval means 23 executes retrieval operation of whether or not the keyword of the information provider N is in the mail from the information demander n.

S (n, N) represents a retrieval result. S (a, A) represents the retrieval results of whether or not the keyword of the information provider A is in the mail (a) of the information demander a. The retrieval processing is performed for every mail and for every information provider Next, the delivery destination determination means 24, based on the retrieval result S (n, N) retrieved by the retrieval means 23, obtains a delivery destination result R (n, $N_1$, $N_2$, $N_3$ . . . ) representing that the mail from the information demander n hits the keywords of the information providers $N_1$, $N_2$, $N_3$ . . . . Specifically, the information providers $N_1$, $N_2$, $N_3$ . . . as the delivery destination of the mail can be determined by the delivery destination determination means 24. For example, the mail from the information demander a is delivered to $N_{a1}$, $N_{a2}$, $N_{a3}$ . . . .

Next, the delivery means 25 delivers the mail from the information demander n to the information providers $N_1$, $N_2$, $N_3$ . . . in accordance with the delivery destination result determined by the delivery destination determination means 24.

Each information provider who received the mail decodes the mail from the information demander, and forms a reply mail A (n) to the information demander n. Specifically, the information provider forms information that fits the demand information. Each of the information providers $N_1$, $N_2$, $N_3$ . . . transmits the reply mails A (n1), A (n2), A (n3) . . . to a mailbox of the information demander n in the mediate apparatus 2. Then, the information demander n reads the mails A (n1), A (n2), A (n3) . . . for the attention of himself/herself.

Next, a specific example of an operation of the article information providing system will be described.

(1) Firstly, the information demander transmits the mail from the portable terminal 1 to the mediate apparatus 2 of the mediate company. For example, the mail has a content such as "I want to buy a hair coloring product for coloring in bright red among the newly introduced hair coloring products this spring A hair color-coating product is also acceptable. I also want to know the price and the size."

(2) Next, the mediate apparatus 2 retrieves the keywords in the mail by the registered keywords for each company. Herein, a keyword "hair coloring" is registered by an A company, a B company and a C company, while a keyword "hair color-coating" is registered by the information providers of the A company, the B company and a D company.

As a result of retrieving by the registered keywords of each company, the A company and the B company had a hit at "hair coloring" and "hair color-coating", the C company had a hit only at "hair coloring", and the D company had a hit only at "hair color-coating". Accordingly, the A company, the B company, the C company and the D company are determined as a delivery destination.

(3) Next, the mediate apparatus 2 transmits the mail from the information demander to the A company, the B company, the C company and the D company.

(4) Each information provider reads the mail from the information demander, selects articles corresponding to the content of the mail among the each own products, and transmits a mail replying to the demand of the information demander to the mediate apparatus 2 (the mail includes the article information for the articles selected).

(5) The information demander accesses a mail reception server in the mediate apparatus 2 to read the mails sent to him/her by the information providers, and examines the articles of the information providers for the attention of him/her on the basis of the mails.

As described above, in the article information providing system of the first embodiment, when the information demander inputs the demand information for an article to the portable terminal at a store and the like, the mediate apparatus provides information That fits the demand information. Then, since the information demander can take out the provided information by the portable terminal, he/she can accurately select a desired article by referring to the information.

As a result, the information demander needs not to collect advertisements, catalogs and the like, which can reduce a burden to the information demander. The information demander also can accurately select a desired article without an advice of the salesclerk.

Figure 3:
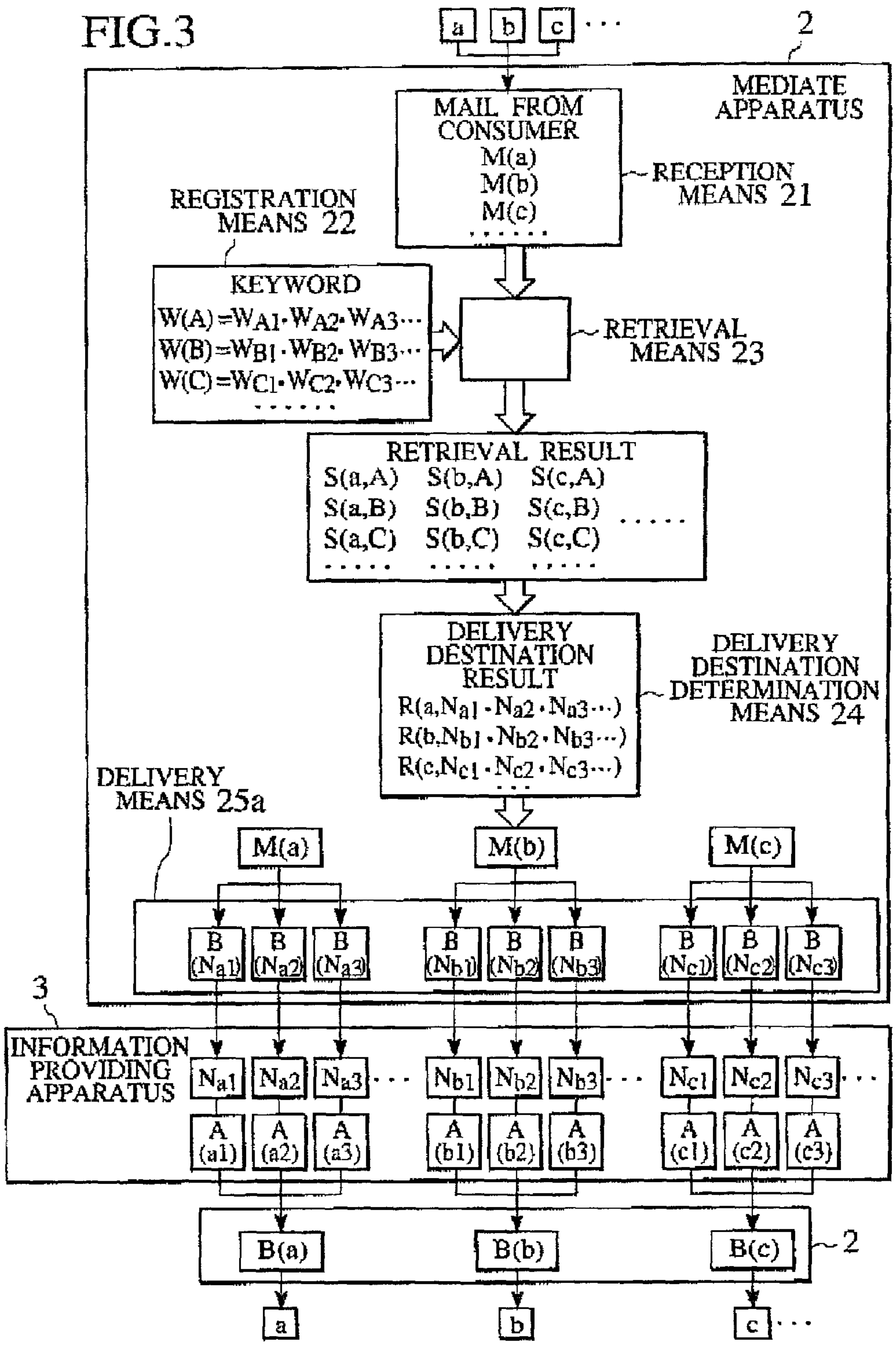
FIG. 3 is a diagram showing a basic operation of a second embodiment of the article information providing system.

FIG. 3 shows a second embodiment of the article information providing system. In the article information providing system of the first embodiment, the delivery means 25 transfers the mail to the information provider. On the contrary, in the article information providing system of the second embodiment, a delivery means 25*a* comprises an electronic bulletin board for registering the mail in the mail box as a storage area provided for every delivery destination determined. The registered mail is accessed and read by the information provider. Therefore, the operation of the second embodiment of the article information providing system is different from the operation of the first embodiment of the article information providing system in the processing of the delivery means 25*a* and the processing of the information providing apparatus 3. Description will be made for these processings only.

Firstly, the delivery means 25*a* registers the mail from the information demander n in a mailbox B (N) for the information providers $N_1$, $N_2$, $N_3$ . . . . For example, the mail M (a) is registered in the mailbox B($N_{a1}$), B ($N_{a2}$) and B ($N_{a3}$).

Each information provider accesses its own mail box to read out the mail from the information demander, and decades the mail from the information demander to form the reply mail A (n) for the attention of the information demander n. Specifically the information that fits the demand information is formed. Each of the information providers $N_1$, $N_2$, $N_3$ . . . transmits the reply mails A (n1), A (n2), A (n3) . . . to the mailbox of the information demander n in the mediate apparatus 2. The information demander n reads the mails A (n1), A (n2), A (n3) . . . for the attention of him/her.

As described above, the effects similar to those of the article information providing system of the first embodiment can be obtained by the article information providing system of the second embodiment.

Note that the present invention is not limited to the article information providing systems of the foregoing embodiments. Each information providing apparatus 3 may transmit the article information and added information such as catalog explaining the articles to the mediate apparatus 2, and the portable terminal 1 may read out the article information and the added information from the mediate apparatus 2. Accordingly, the information demander can select the article more accurately by referring to the article information and the added information.

Moreover, in the embodiments, the information providing system 3 automatically sends back the information that fits the demand information to the mediate apparatus 2. However, an operator of the information provider, for example, may manually select and transmit the article information in the information providing apparatus 3 related to the demand information. In this case, the operator can add each kind of comment as information.

The information provider may directly transmit the information that fits the demand information to the portable terminal 1 without via the mediate apparatus 2, instead of transmitting the information that fits the demand information from the information provider to the mediate apparatus 2 by the information provider and reading out the information from the mediate apparatus 2 by the information demander.

As the portable terminal, there is a device capable of inputting/outputting communication and information by a so-called radio method including a cellular phone. When the cellular phone is used as the portable terminal 1, voice can be used for inputting/outputting communication and information. In such a case, the information provider of the delivery destination is determined by extracting the keywords that are made to correspond to the information provider by voice information that the information demander inputs by the voice. Specifically, the keywords are registered as the voice information and correspondence may be directly retrieved, or retrieval may be performed after a message is converted into character information.

Matching speed can be increased by converting the voice message to the character information as in the embodiments. In addition, when the demand information by the voice is delivered to the information provider, information other than the meaning of the words such as a portion of a strong desire of the information demander, expressed by the dynamics of the voice can be discriminated. Thus, the information provider can provide more suitable article information to the information demander.

Note that more appropriate information exchange can be made between the information demander and the information provider by adding image information to the article information. The image information includes a moving picture in addition to a still image such as a photograph and a picture, where the voice information may be included. As a file format, any format may be used as long as the information can be transmitted, such as a bit map, HTML, DHTML, MPEG, PCT and PDF. These kinds of image information and voice information may not only be attached to a regular mail, but also may be the image information or the voice information itself. Thus, the object of the present invention can be achieved by the image information or the voice information alone.

In the case where the amount of the information is large, the information is previously input to a memory stick or the like, and the information can be transmitted at once. According to this method, the information can be input not only from the concerned terminal but also from other terminals, which can be transmitted from any one of the terminals.

The mediate company does not need To own the mediate apparatus, but may provide the apparatus in an organization such as a consumer consulting section. In such a case, the information provider may be a plurality of divisions in one company. Moreover, what is selected may be not only the article but also service.

In general, the demand information for the articles desired by the consumer varies in accordance with circumstances. According to the present invention, an information provider can accurately provide article information in a short time under any circumstances in accordance with the demand information desired by the consumer.

For example, in the case where the consumer goes shopping for the article after previously deciding which article he/she would buy, the consumer, by specifying the article name, requests the mediate company (the mediate apparatus) of the detail information regarding the article decided in advance as the demand information (Such detail information is a guide for judging whether or not the article is the best one, particularly the information not written in the statement on the back of the article. For example, the guide such as “Is the article irritant?", "Is the article suitable for damaged hair?" and the like.). Accordingly, the consumer opens the information mail at the store and can decide where or not to buy the article while looking at the real article.

In the case where the consumer shows interest to the article other than the one already decided to buy, he/she also specifies the article name to make an additional request about the article information to the mediate company (a competitive article to the article previously decided, or the like) as the demand information. After receiving the information, the consumer opens the additional information mail, and can decide which one he/she would buy at that time.

Moreover, in the case where the consumer goes shopping without deciding which article to buy (but with a desire such that he/she wants to buy a thing like this), the consumer makes a request to the mediate company for the information regarding the articles suitable for his/her desire in advance as the demand information (Such information is the guide that provides the customer with the information as to which article is the one he/she wants most. For example, the guide such as "I want to make my hair softer.", "I want make my hair look brighter." and the like). Accordingly, the consumer opens the information mail at the store and can decide which article to buy while looking at possible articles. In this case, the consumer photographs his/her head by a camera or a digital camera attached to the portable terminal, and can send the photographed picture by attaching it to the mail. The photographed picture is sent as an image file that shows a hairstyle and a hair color, or as a moving picture of hair being flown or hair showing when the head is moved for showing how the hair is in shape.

Furthermore, in the case where the consumer goes shopping without deciding which article to buy (wondering if there is anything he/she wants to buy), the consumer requests what he/she wants to know in detail regarding the articles as the demand information from the mediate company at the store (the monadic information in judging whether or not the article is the one that meets his/her value indeed, for example, the detail concept and the target of the article, frequently asked questions in the past, and the like). After receiving the information, the consumer opens the information mail, and can decide which one he/she would buy at the store while looking at the articles.

Still further, in the case where the consumer had an impulse such that he/she wanted to buy an article he/she found at the store by chance, the consumer requests the guide for judging whether there is not a problem with impulse buying as the demand information from the mediate company (such as "Is the price appropriate?" and "Isn't the article listed as a defective?"). After receiving the information, the consumer opens the additional information mail, and decides whether or not to buy the article after it is judged that the article does not have a problem. In this case, it is convenient to prepare a system in which the consumer can immediately obtain information such as a standard price and whether or not the article is listed on a defective article list (a black list), on specifying the article name when the customer immediately wants the guide for judgment since he/she cannot wait for the information mail.

In addition, in the case where a particular article that the customer liked (the article that he/she was going to buy) was not sold at the store, the consumer requests the name of the store that sells the article and the location thereof as the demand information from the mediate company (sending the article name, the characteristic of the article, the image of the article itself and the like). After receiving the information, the consumer opens the information mail, visits the store by looking at the store name, its location map and the like, and can buy the article.

As described above, according to the present invention, when the information demander inputs the demand information about the article to the portable terminal, the mediate apparatus provides the information demander with the information from the information provider. Since the information demander can take out the provided information by the portable terminal, he/she can accurately select the desired article in a short time by referring to the information directly sent from the article information provider.

All documents referred to herein are specifically incorporated herein by reference in their entireties.

The priority document, Japanese Patent Application no. 2000-170658, filed Jun. 7, 2000 is expressly incorporated herein by reference in its entirety.

What is claimed is:

1. An article information providing system, comprising:

a portable terminal to which an information demander inputs a desire for an article as demand information, and configured to receive information corresponding to said demand information from an information provider;

a mediate apparatus provided with:

registration means for previously registering each information provider and a keyword so as to allow the information and the keyword to correspond to each other;

retrieval means for retrieving said keyword from said demand information;

delivery destination determination means for determining said information provider as a delivery destination of said demand information;

means for delivering said demand information to said information provider, said information provider being registered in said registration means while corresponding to the keyword when the keyword is retrieved from the demand information; and transmission means for transmitting information to said information demander, the information being provided from the information provider in response to said demand information.

2. A mediate apparatus for mediating demand information to an information provider, the demand information being input to a portable terminal with regard to an article by an information demander, comprising:

registration means for previously registering each information provider and a keyword so as to allow the information and the keyword to correspond to each other;

retrieval means for retrieving said keyword from said demand information;

delivery destination determination means for determining said information provider as a delivery destination of said demand information, said information provider being registered in said registration means while corresponding to the keyword when said keyword is retrieved from the demand information;

means for delivering said demand information to said information provider; and transmission means for transmitting information to said information demander, the information being provided from the information provider in response to said demand information.

3. The mediate apparatus according to claim 2, wherein said mediate apparatus is included in a computer system operating as a server and comprises demand information reception means for receiving said demand information.

4. The mediate apparatus according to claim 2, further comprising:

information reception means for receiving information, the information being provided from the information provider determined by said delivery destination determination means and corresponding to said demand information.

5. A portable terminal used by an information demander when obtaining article information provided by an information provider via a mediate apparatus comprising:

an interface section to which the information demander inputs a desire for an article as demand information potentially including a keyword, and which outputs information provided from said information provider in response to said demand information, wherein the mediate apparatus includes a delivery section that delivers said demand information to said information provider and a transmission section that transmits information from said information provider in response to said demand information.

6. The portable terminal according to claim 5, wherein said interface section is at least one of a browser, a home page and a portal site.

7. A providing method of article information, comprising the steps of:

registering each information provider and a keyword previously so as to allow the information and the keyword to correspond to each other;

urging an information demander to input a desire for an article to a portable terminal as demand information potentially including a keyword;

receiving said demand information;

retrieving said keyword from said demand information;

determining the information provider as a delivery destination of said demand information, the information provider being registered while corresponding to the keyword when said keyword is retrieved;

delivering said demand information to said information provider;

receiving information provided from said information provider in response to the demand information; and transmitting said provided information received by said provided information reception means to said information demander.

8. A method, in which an information demander obtains article information from an information provider via a mediate apparatus, comprising the steps of:

inputting a desire for an article to a portable terminal as demand information potentially including a keyword by the information demander; and receiving information from said information provider via the mediate apparatus, the information being provided from the information provider in response to said demand information, wherein the mediate apparatus includes a delivery section that delivers said demand information to said information provider and a transmission section that transmits information from said information provider in response to said demand information.

9. The mediate apparatus according to claim 8, wherein said demand information is at least one of character information, image information and voice information.

10. The mediate apparatus according to claim 8, wherein said demand information is transmitted to said mediate apparatus together with terminal identification information.

11. The mediate apparatus according to claim 10, wherein said terminal identification information is at least one of a telephone number, a mail address and an account (a user ID).

12. A recording medium readable by a computer providing article information, comprising the steps of:

registering each information provider and a keyword previously so as to allow the information and the keyword to correspond to each other;

urging an information demander to input a desire for an article to a portable terminal as demand information potentially including a keyword;

receiving said demand information;

retrieving said keyword from said demand information;

determining the information provider as a delivery destination of said demand information, the information provider being registered while corresponding to said keyword when said keyword is retrieved;

delivering said demand information to said information provider;

receiving information corresponding to said demand information and provided from said information provider; and transmitting the information to said information demander, the information being provided from said information provider in response to said demand information.

13. A computer-readable recording medium used by an information demander when obtaining article information from an information provider via a mediate apparatus, wherein the computer-readable recording medium is recorded with an article information transmission/reception program for executing:

a step of inputting a desire for an article to a portable terminal as demand information potentially including a keyword by an information demander;

a step of delivering said demand information to said information provider; and a step of receiving provided information from the information provider, the provided information being provided from said information provider via the mediate apparatus in response to said demand information, wherein the mediate apparatus includes a delivery section that delivers said demand information to said information provider and a transmission section that transmits information from said information provider in response to said demand information.

14. The mediate apparatus according to claim 13, wherein said demand information is at least one of character information, image information and voice information.

15. The mediate apparatus according to claim 13, wherein said demand information is transmitted to said mediate apparatus together with terminal identification information.

16. The mediate apparatus according to claim 15, wherein said terminal identification information is at least one of a telephone number, a mail address and an account (a user ID).

17. A computer program stored on a computer readable medium for providing article information; causing a computer to execute the steps of:

registering each information provider and a keyword previously so as to allow the information and the keyword to correspond to each other;

receiving demand information;

urging an information demander to input a desire for an article to a portable terminal as demand information;

retrieving said keyword from said demand information;

determining the information provider as a delivery destination of said demand information, the information provider being registered while corresponding to said keyword when said keyword is retrieved;

delivering said demand information to said information provider;

receiving information provided from said information provider and corresponding to said demand information; and transmitting the provided information to said information demander, the provided information being provided from said information provider in response to said demand information.

18. An article information transmission/reception program stored on a computer readable medium and used by an information demander when obtaining article information from an information provider via a mediate apparatus, causing a computer to execute the steps of:

inputting a desire for an article to a portable terminal as demand information potentially including a keyword by the information demander;

delivering said demand information to said information provider; and receiving provided information from the information provider, the provided information being provided from said information provider via said mediate apparatus in response to said demand information, wherein the mediate apparatus includes a delivery section that delivers said demand information to said information provider and a transmission section that transmits information from said information provider in response to said demand information.

19. The mediate apparatus according to claim 18, wherein said demand information is at least one of character information, image information and voice information.

20. The mediate apparatus according to claim 18, wherein said demand information is transmitted to said mediate apparatus together with terminal identification information.

21. The mediate apparatus according to claim 20, wherein said terminal identification information is at least one of a telephone number, a mail address and an account (a user ID).

* * * * *